US011951511B2

(12) United States Patent
Robeling et al.

(10) Patent No.: US 11,951,511 B2
(45) Date of Patent: Apr. 9, 2024

(54) METHOD FOR MANUFACTURING A MULTILAYER PVC SEMIFINISHED PRODUCT AND A CORRESPONDING APPARATUS

(71) Applicant: OLBRICH GmbH, Bocholt (DE)

(72) Inventors: Dirk Robeling, Bocholt (DE); Andre Josten, Bocholt (DE); Frans Te Welscher, Bocholt (DE); Matthias Hollstegge, Kalkar (DE)

(73) Assignee: OLBRICH GmbH, Bocholt (DE)

( * ) Notice: Subject to any disclaimer, the term of this patent is extended or adjusted under 35 U.S.C. 154(b) by 0 days.

(21) Appl. No.: 17/832,990

(22) Filed: Jun. 6, 2022

(65) Prior Publication Data

US 2022/0388034 A1 Dec. 8, 2022

(30) Foreign Application Priority Data

Jun. 7, 2021 (DE) ..................... 10 2021 114 572.4

(51) Int. Cl.

*B05D 7/24* (2006.01)
*B05C 5/02* (2006.01)
*B05D 3/00* (2006.01)
*B05D 7/00* (2006.01)
*B05D 7/04* (2006.01)

(52) U.S. Cl.

CPC .............. *B05D 7/24* (2013.01); *B05C 5/0262* (2013.01); *B05D 3/007* (2013.01); *B05D 7/04* (2013.01); *B05D 7/544* (2013.01)

(58) Field of Classification Search

None

See application file for complete search history.

(56) References Cited

U.S. PATENT DOCUMENTS

| | | | | |
|---|---|---|---|---|
| 3,870,591 | A * | 3/1975 | Witman | E04F 15/10 428/318.6 |
| 2001/0028127 | A1* | 10/2001 | Hinds | B29C 43/30 264/126 |
| 2002/0176945 | A1* | 11/2002 | Hudson | B05C 5/0254 427/407.1 |

FOREIGN PATENT DOCUMENTS

| | | | |
|---|---|---|---|
| DE | 619128 | C | 9/1935 |
| DE | 2345049 | A1 | 3/1975 |
| DE | 2455318 | A1 | 8/1976 |
| DE | 20306931 | U1 | 7/2003 |
| DE | 60212498 | T2 | 12/2006 |
| DE | 102017114266 | B4 | 8/2020 |
| EP | 644645 | A1 | 3/1995 |

(Continued)

*Primary Examiner* — Francisco W Tschen

(74) *Attorney, Agent, or Firm* — Jones Day

(57) ABSTRACT

A method for manufacturing of a multilayer PVC semi-finished product, in particular a multilayer PVC synthetic leather or a multilayer PVC foam sheet, the method comprising the steps of:

a. Coating a coated or uncoated carrier web with a PVC plastisol, whereby a carrier web coated with an ungelled plastisol layer is obtained; thereafter
b. Gelling the ungelled plastisol layer, whereby a carrier web coated with a gelled plastisol layer is obtained; and thereafter
c. Cooling the carrier web coated with the gelled plastisol layer; characterized in that the coating comprises coating the carrier web with at least two PVC plastisols one above the other, simultaneously or in immediate succession. A corresponding apparatus is further described.

7 Claims, 4 Drawing Sheets

(56) References Cited

FOREIGN PATENT DOCUMENTS

| | | | |
|---|---|---|---|
| EP | 1260279 | B1 | 11/2002 |
| WO | 2020055466 | A1 | 3/2020 |

* cited by examiner

METHOD FOR MANUFACTURING A MULTILAYER PVC SEMIFINISHED PRODUCT AND A CORRESPONDING APPARATUS

CROSS-REFERENCE TO RELATED APPLICATIONS

This application claims the benefit and priority of German Patent Application No. 10 2021 114 572.4 filed Jun. 7, 2021. The entire disclosure of the above application is incorporated herein by reference.

BACKGROUND OF THE INVENTION

Technical Field

The invention starts from a method for manufacturing of a multilayer PVC semi-finished product, in particular a multilayer PVC synthetic leather or a multilayer PVC foam sheet, which method comprises coating a coated or uncoated carrier web with a PVC plastisol, whereby a carrier web coated with an ungelled plastisol layer is obtained. Subsequently, the ungelled plastisol layer is gelled, wherein a carrier web coated with a gelled plastisol layer is obtained. Subsequently, the carrier web coated with the gelled plastisol layer is cooled, whereby the described method step sequence of coating, gelling and cooling can be repeated as often and, if necessary, with different PVC plastisols until the desired layer structure of the multilayer PVC semi-finished product is achieved. Coating often involves a brush coating process in which a gap is maintained between a doctor blade and the substrate, which determines the layer thickness of the applied PVC plastisol, while the substrate with the plastisol applied to it is conveyed away under the doctor blade. Such a method is known from DE 619128 A.

Discussion

DE 10 2017 114 266 B9 describes a method for producing a wrapping tape in which a carrier web is coated with a UV-crosslinkable adhesive coating, the adhesive coating being applied to the carrier via a nozzle of a coating machine.

WO 2020/055466 A1 describes a multi-channel print head for additive manufacturing.

The various layers of the PVC semi-finished product are each designed to impart a specific mechanical, optical, haptic or other technical function to the semi-finished product. Each of these PVC plastisol layers must be formed on the carrier web using the described method step sequence of coating, gelling and cooling. In particular, the formation of each of the layers thus requires separate heating and cooling of the entire previous material structure. Furthermore, during the entire manufacturing process, the process air has to be controlled and, if necessary, retreated. The production of multilayer PVC semifinished products is therefore extremely energy-intensive.

SUMMARY

It is therefore the aspect of the invention to further develop the method described at the beginning in such a way that it has lower energy consumption and preferably the number of method steps, in particular the heating and cooling steps, is reduced.

This aspect is solved by a method having the feature of claim 1. The adjacent claim 11 relates to a corresponding apparatus. Advantageous embodiments of the invention are in each case the subject of the dependent claims.

Accordingly, it is provided that the coating comprises the simultaneous or immediately successive coating of the carrier web with at least two PVC plastisols one above the other. Thus, a so-called wet-on-wet coating of several ungelled plastisols is described, which are gelled together during the subsequent gelling and cooled together during the subsequent cooling of the gelled plastisol layer produced therefrom. Preferably, exactly two PVC plastisols are coated onto the carrier web at the same time or in immediate succession, the two PVC plastisols being applied to the carrier web arranged one above the other so that a first of the two PVC plastisols is in contact with the carrier web or an underlying, for example previously applied, coating, for example a plastisol layer, while the overlying, second PVC plastisol rests on the previously mentioned, first PVC plastisol.

Preferably, the PVC plastisols have a viscosity that prevents mixing of the two PVC plastisols or limits it to a permissible or tolerable minimum. Accordingly, compared with the formation of individual plastisol layers from single PVC plastisols previously applied, a number of PVC plastisols arranged simultaneously or immediately one above the other in a single sequence of coating, alloying and cooling can be formed into a gelled plastisol layer, so that the number of heating and cooling cycles of the product is reduced and thus energy is saved. The exhaust air flow required for the process is also reduced.

Simultaneous or immediately successive coating of the superimposed PVC plastisols can be accomplished with the aid of a multilayer slot nozzle having individual slots arranged one behind the other in the direction of relative movement of the substrate layer with respect to the multilayer slot nozzle, so that substantially simultaneous application of the two PVC plastisols to the substrate layer can be achieved.

Preferably, so-called E-PVC plastisols are used, which are produced by emulsion polymerization. Due to their viscosity, these are characterized by low intermixing when they are arranged as ungelled plastisols on top of each other wet-on-wet on the carrier substrate after coating and before gelling.

Particularly advantageously, the two PVC plastisols coated simultaneously or immediately one after the other are matched to each other in terms of viscosity in such a way that they mix only insignificantly with each other, or mixing with each other is permitted only to the extent that the preferred material properties of the finished PVC semi-finished product are not unduly adversely affected.

The ungelled plastisol layers can be coated directly on top of each other on the carrier web or a gelled plastisol layer can be coated on the carrier web.

Just as the two PVC plastisols are coated onto the carrier web simultaneously or in immediate succession, the coated PVC plastisols or the multilayer plastisol layer formed from them can also be gelled simultaneously.

The step sequence consisting of coating a coated or uncoated carrier web with a PVC plastisol, gelling the ungelled plastisol layer obtained in the process and cooling the gelled plastisol layer obtained in the process can be repeated at least once. Thereby, in at least one of the sequences of steps in coating the coated or uncoated carrier web, the carrier web may be coated with the at least two PVC plastisols simultaneously or in immediate succession. In particular, it is thus conceivable to have a process in which only a subset of a plurality of successive step sequences consisting of coating, gelling and cooling are replaced by the method according to the invention, in which the coating comprises the simultaneous or directly successive coating of the carrier web with at least two PVC plastisols one on top of the other.

Accordingly, in at least one further of the step sequences consisting of coating, gelling and cooling, the coating of the carrier web can be carried out with just one PVC plastisol, i.e. the layer in question can be produced in the manner known from the prior art.

When coating the carrier web with at least two PVC plastisols simultaneously or in immediate succession, two PVC plastisols can be applied to the carrier web which differ from each other in at least one material property. Preferably, the two PVC plastisols may differ from each other in at least one material property other than their viscosity. For example, a first of the at least two PVC plastisols that foams upon gelling may be coated wet-on-wet onto a compact PVC plastisol that does not undergo foaming upon gelling. Accordingly, the first PVC plastisol may have a blowing agent, while the second PVC plastisol is free of blowing agent.

In particular, however, the viscosity of a lower one of the at least two superimposed PVC plastisols may be greater than the viscosity of the PVC plastisol above it.

In the case of simultaneous or immediately successive coating, the at least two PVC plastisols can be applied to the coated or uncoated carrier web via a single slot in each case of a multilayer slot nozzle having a plurality of individual slots that are fluidically separated from one another.

At least one of the individual slots may be supplied with the associated PVC plastisol by a pump. Before coating or during coating, the method may provide for adjusting a layer thickness of at least one of the PVC plastisols applied to the carrier web during coating. For this purpose, a delivery rate of the pump, preferably a rotational speed of the pump, and/or a feed rate of the carrier web can be adjusted with respect to the multilayer slot nozzle.

In particular, a delivery rate of the pump can be adjusted as a function of a feed rate of the carrier web with respect to the multilayer slot nozzle and/or as a function of a width of the multilayer slot nozzle perpendicular to the feed direction of the carrier web.

According to another aspect, an apparatus is described that is adapted to carry out the method described above. In particular, the apparatus may be configured as a transfer coating apparatus. Accordingly, the apparatus is adapted for producing a multilayer PVC semi-finished product, in particular a multilayer PVC synthetic leather or a multilayer PVC foam sheet. In this regard, the apparatus may comprise at least one coating unit for coating a coated or uncoated carrier web with a PVC plastisol. The apparatus may further comprise a gelling unit for gelling the PVC plastisol, adjoining the coating unit in a conveying direction of the carrier web. Further, the apparatus may comprise a cooling unit adjoining the gelling unit in the conveying direction of the carrier web for cooling the carrier web coated with the PVC plastisol. The apparatus is characterized in that the coating unit is set up for simultaneous or directly successive coating of the carrier web with at least two PVC plastisols one above the other. The gelling unit can have a tempering unit which is set up to temper the PVC plastisols, for example for a few minutes, at 160-200° C., for example.

For the simultaneous or directly successive coating of the carrier web with at least two PVC plastisols one above the other, the apparatus can have a multilayer slot nozzle with at least two fluidically separated individual slots. At least one of the individual slots can have an adjustable slot width. Preferably, the slot widths of both individual slots are adjustable independently of each other.

For example, the slot widths can be between 50 and 1000 m, preferably between 50 and 700 m, and particularly preferably between 200 and 500 m. The viscosities of the at least two PVC plastisols may be between 1 and 15 Pa·s preferably between 2 and 8 Pa·s and more preferably between 3 and 7 Pa·s. Further preferably, the viscosity of a first of the two PVC plastisols disposed below a second of the PVC plastisols may be greater than the viscosity of the second PVC plastisol.

BRIEF DESCRIPTION OF THE DRAWINGS

Further details of the invention are explained in the figures below. Thereby showing.

DESCRIPTION OF THE PREFERRED EMBODIMENTS OF THE INVENTION

Multilayer PVC plastisol products, for example multilayer PVC artificial leather, consist of several layers, each of which is applied individually as plastisol to the carrier web or to a coating previously applied to the carrier web. After coating, the ungelled plastisol layer is changed to a gel by thermal treatment and, after a final cooling, a subsequent layer can be applied again to the carrier web or the plastisol layer previously applied to it using the same process sequence.

This is made necessary by the product structure of PVC semi-finished products, for example in the case of artificial leather, where each layer fulfills a different task. For example, there is a surface that is supposed to have a special look and surface feel, while softer, underlying layers, often foam layers, influence the flexibility and thickness of the material in a special way.

Figure 1:
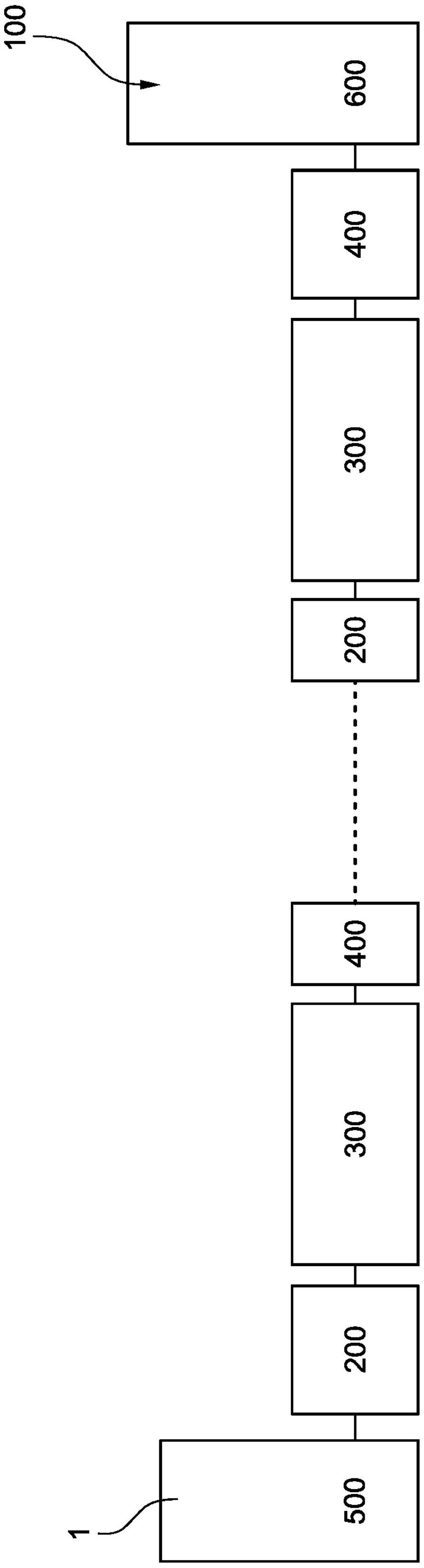
Fig. 1 Prior Art
FIG. 1 is a schematic diagram of a method for manufacturing of a multilayer PVC semi-finished product as known from the prior art.

FIG. 1 shows in schematic representation an exemplary transfer coating method for manufacturing of a multilayer PVC semi-finished product 100 according to the state of the art. In addition to an unwinding unit 500 for providing the carrier material 1, a number of process stages corresponding to the number of plastisol layers of a multilayer PVC semifinished product 100 to be produced are provided, each consisting of a coating unit 200 for coating the carrier web 1 with a PVC plastisol, a subsequent gelling unit 300 for gelling the PVC plastisol, and a cooling unit 400 subsequent to the gelling unit for cooling the carrier web 1 coated with the gelled PVC plastisol. After all of the process stages consisting of coating unit 200, gelling unit 300 and cooling unit 400 have been passed through by the carrier material 1, the coated carrier material 1 or the PVC semi-finished product 100 formed therefrom can be rolled up and stored in a reeling unit 600.

Accordingly, in the prior art it is necessary that for each layer of the multilayer PVC semifinished product 100 to be produced, the coated or optionally still uncoated carrier web 1 is first coated with the ungelled plastisol, then the carrier web 1 coated with the still ungelled plastisol is heated, to stimulate gelling of the plastisol, and then the carrier web with the gelled plastisol is cooled again to enable the cooled, gelled plastisol layer to be coated with a next, ungelled plastisol layer. The frequent heating and re-cooling of the semi-finished product 100 or the precursor product is correspondingly energy-intensive.

Figure 2:
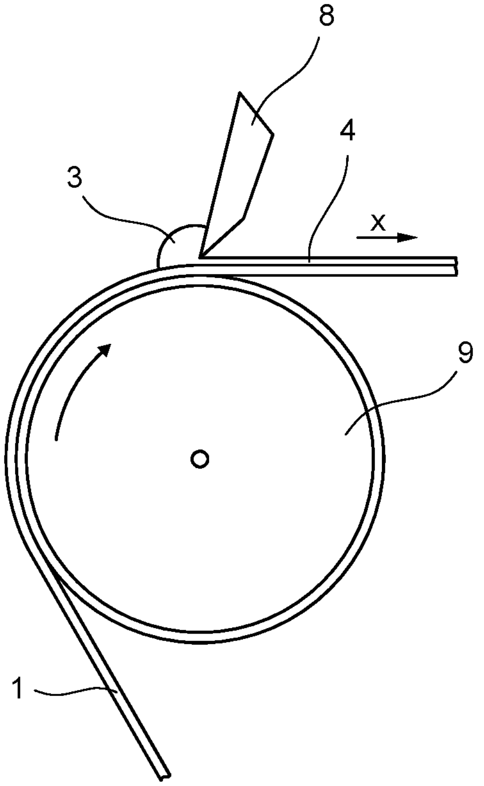
Fig. 2 Prior Art
FIG. 2 is a schematic representation of the application of a plastisol to a carrier web using the prior art coating process.
Figure 3:
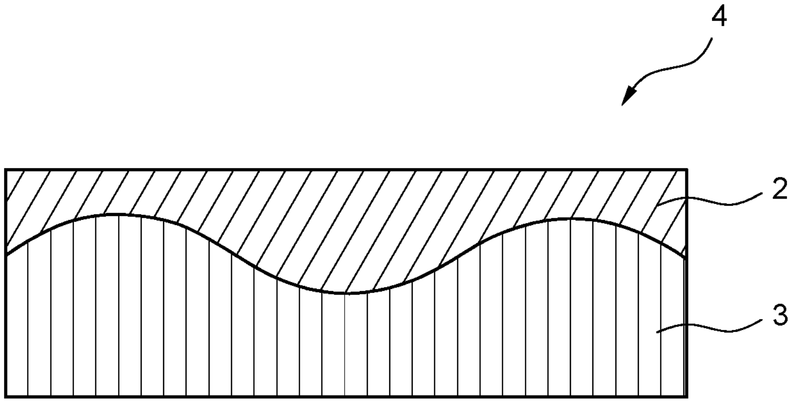
Fig. 3 Prior Art
FIG. 3 is a schematic cross-sectional view of a multilayer plastisol layer formed by the process according to FIG. 2.

FIGS. 2 and 3 show a detail of the coating unit 200 according to FIG. 1 and a plastisol layer 4 obtained thereby. For coating, the carrier web 1 of the coating unit 200 is transported along a transport system in the feed direction x in a reproducible position with respect to a doctor blade 8, wherein the transport system may, for example, comprise a plurality of rollers 9. In the coating system 200, a still plastisol 3 is metered onto the carrier web 1 and is formed into an ungelled plastisol layer with a smooth surface on the carrier web 1 in a coating process by a doctor blade 8, which is arranged while maintaining a gap to the upper side of the carrier web 1. In the manner previously described with reference to FIG. 1, the carrier web 1 with the plastisol layer 4 applied thereto can be treated in a subsequent process step by heating the carrier web 1 with the ungelled plastisol layer applied thereto, so that the plastisol layer 4 gels and, after a cooling process, can be made available for further coating analogous to the process shown in FIG. 2.

FIG. 3 illustrates another disadvantage, of the prior art brush coating process, which is that unevenness or texture on the top of a previously applied plastisol layer, here formed by the PVC plastisol 3, is leveled by the use of the smoothing blade 8 when another plastisol 2 is applied to it, so that the brush coating process is also not suitable for conveying haptic properties across subsequently applied plastisol layers.

Figure 4:
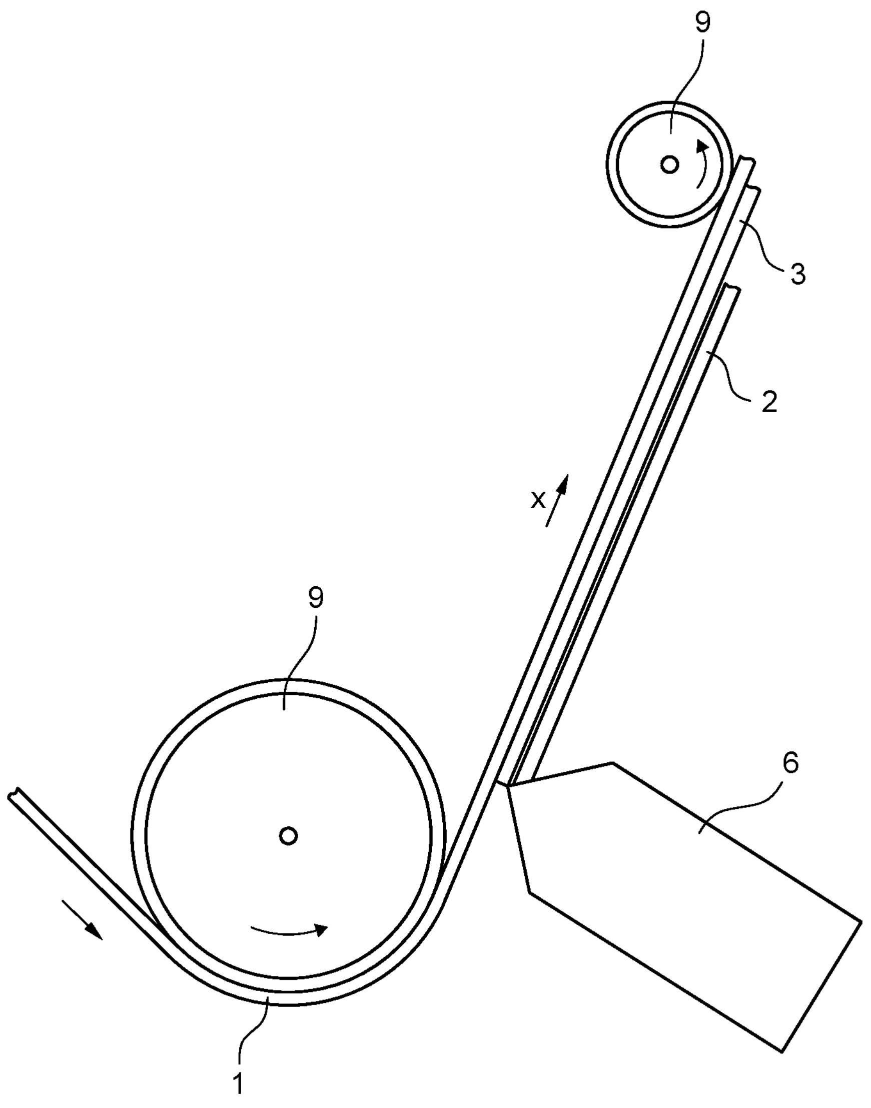
FIG. 4 is a schematic representation of an exemplary embodiment of the multilayer coating of a carrier web according to the invention.

FIG. 4 shows an exemplary embodiment for coating an uncoated carrier web 1 according to the invention with two PVC plastisols 2, 3, which are applied simultaneously to the carrier web 1 with the aid of a multilayer slot nozzle 6. Using the process according to the invention, several or all of the layers of a multilayer PVC semifinished product can be coated simultaneously and one on top of the other, so that at least two intermediate thermal steps (heating and cooling) can be omitted.

For this purpose, the carrier web 1 is conveyed by at least two rollers 9, for example of a transfer coating machine. The two plastisol layers 2, 3 are applied directly to each other in their ungelled state, i.e. wet-on-wet, on the carrier web 1. In particular, the preferred E-PVC plastisols have an inherent viscosity which ensures that the two flowable PVC plastisols 2, 3 do not mix with each other, or only insignificantly, so that even after the subsequent gelling of the plastisols 2, 3, the multilayer plastisol layer 4 produced therefrom has the respective functional property of the PVC plastisol 2, 3 concerned on its opposite sides and thus, in particular, no mixing or even mutual cancellation of material properties has to be accepted.

Figure 5:
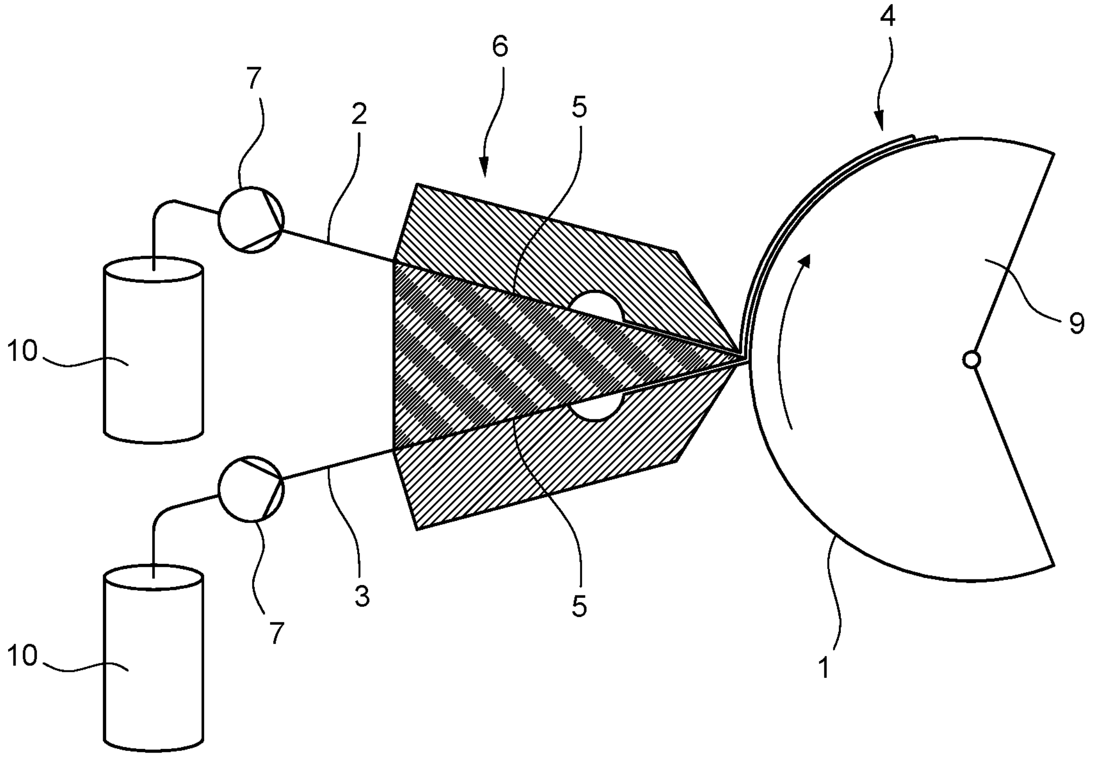
FIG. 5 is a schematic representation of a further embodiment of a multilayer coating apparatus according to the invention.

FIG. 5 shows in cross-section perpendicular to the longitudinal direction of the individual slots 5 an exemplary embodiment of a multilayer slot nozzle 6 which can be used according to the invention and which has a plurality of fluidically separated individual slots 5, with the aid of which the at least two PVC plastisols 2, 3 are applied to the carrier web 1 via one of the two individual slots 5 in each case during simultaneous or directly successive coating.

The multilayer slot nozzle 6 can be arranged in particular without contact with respect to the material web 1 or the roll 9 and in particular also with respect to the plastisols 2, 3 deposited on the roll 9 or the material web 1. Consequently, a distance of the multilayer slot nozzle 6 in relation to the material web 1 including any previously applied coatings can be greater than the sum of the individual thicknesses of the plastisols 2, 3 in the ungelled state. Accordingly, the multilayer slot nozzle 5 also does not mechanically shape, in particular smooth or level, the upper surface of the outer plastisol 2, which represents a further significant difference from the coating process known from the prior art.

The metering of the plastisols 2, 3 and thus the respective layer thickness of the plastisols 2, 3 on the carrier web 1 can be adjusted by controlling a delivery rate of the pumps 7, with the aid of which the respective plastisol 2, 3 is fed from a respectively assigned plastisol supply 10 into a respectively assigned individual slot 5 of the multilayer slot nozzle 6. A further factor for the resulting layer thickness of the individual layers of plastisol layer 4 (cf. FIG. 6) is the rotational speed or peripheral speed of the rollers 9. The thickness of the layers of plastisols 2, 3 on the carrier web 1 can thus be determined solely by controlling the volume flow of plastisols 2, 3 leaving the individual slots 5 of the multilayer slot nozzle 6 and the peripheral speed of the roller 9.

Figure 6:
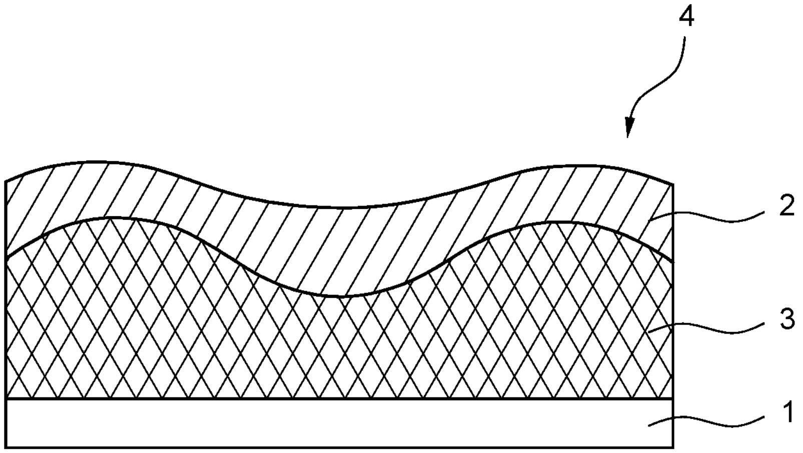
FIG. 6 is a schematic cross-sectional view of a multilayer plastisol layer formed using the apparatus according to FIG. 5.

FIG. 6 illustrates that the outer side of the plastisol layer 4 facing away from the carrier web 1, which is formed by the upper side of the outer PVC plastisol 2, essentially adopts the geometry of the underlying PVC plastisol 3, albeit slightly weakened, so that, for example, haptic properties can also be transported across layers.

The features of the invention disclosed in the foregoing description, in the drawing as well as in the claims may be essential for the realization of the invention both individually and in any combination.

The invention claimed is:

1. A method for manufacturing a multilayer PVC semi-finished product, said method comprising:

forming a first layer by:

a. coating a coated or uncoated carrier web with a PVC plastisol, whereby a carrier web coated with an ungelled plastisol layer is obtained; thereafter b. gelling the ungelled plastisol layer, whereby a carrier web coated with a gelled plastisol layer is obtained; and thereafter c. cooling the carrier web coated with the gelled plastisol layer; and, thereafter;

forming multiple layers on the first layer by:

d. coating the first layer with a plurality of ungelled PVC plastisol layers, wet on wet, simultaneously or in immediate succession; thereafter e. simultaneously gelling the plurality of ungelled plastisol layers; and thereafter f. simultaneously cooling the plurality of gelled plastisol layers by transporting the carrier web through a cooling unit for cooling the gelled plastisol layers.

2. The method according to claim 1, wherein the ungelled plastisol layers are coated directly on top of each other on the carrier web or a gelled plastisol layer is coated on the carrier web.

3. The method according to claim 1, in which, during the simultaneous or immediately successive coating of the carrier web with at least two PVC plastisols, two PVC plastisols are applied to the carrier web which differ from one another in at least one material property, the two PVC plastisols preferably differing from one another in at least one material property other than their viscosity.

4. The method according to claim 1, in which, during the simultaneous or immediately successive coating, the at least two PVC plastisols are each applied to the coated or uncoated carrier web via an individual slot of a multilayer slot nozzle having a plurality of fluidically separated individual slots.

5. The method according to claim 4, in which at least one of the individual slots is pressurized by a pump with the associated PVC plastisol.

6. The method according to claim 5, comprising, before coating or during coating, adjusting a layer thickness of at least one of the PVC plastisols applied to the carrier web during coating, for which purpose a delivery rate of the pump and/or an advancing speed of the carrier web with respect to the multilayer slot nozzle is adjusted.

7. The method according to claim 5, in which a delivery rate of the pump is set as a function of an advancing speed of the carrier web with respect to the multilayer slot nozzle (6) and/or as a function of a width of the multilayer slot nozzle perpendicular to the advancing direction of the carrier web.

* * * * *